UNITED STATES PATENT OFFICE.

HERMANN FRIEDMANN, OF ELBERFELD, GERMANY, ASSIGNOR TO FARBENFABRIKEN VORM. FRIEDR. BAYER & CO., OF ELBERFELD, GERMANY, A CORPORATION OF GERMANY.

VAT DYE.

1,034,895. Specification of Letters Patent. Patented Aug. 6, 1912.

No Drawing. Application filed December 9, 1911. Serial No. 664,858.

*To all whom it may concern:*

Be it known that I, HERMANN FRIEDMANN, doctor of philosophy, chemist, citizen of the German Empire, residing at Elberfeld, Germany, have invented new and useful Improvements in New Vat Dye, of which the following is a specification.

My invention relates to the manufacture and production of new vat dyes of the anthracene series having most probably the formula:

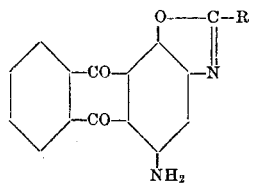

(R meaning a substituent e. g. methyl, ethyl, phenyl, tolyl, xylyl, chlorophenyl, methoxyphenyl, etc.)

The new dyes can be obtained by condensing 1-oxy-2.4-diaminoanthraquinone with aldehydes. They are after being dried and pulverized brown powders soluble in pyridin, yielding vats with hydrosulfite and caustic soda lye which vats dye cotton generally from brown to orange shades. They can be acylated by means of acylizing agents such as acetyl chlorid, benzoyl chlorid, etc., products being thus obtained which are likewise vat dyestuffs dyeing cotton from a hydrosulfite vat generally yellow shade.

In order to illustrate the new process more fully the following example is given, the parts being by weight:—To a solution of 1 part of 1-oxy-2.4-diaminoanthraquinone in 3 parts of nitrobenzene, 1 part of benzaldehyde and some drops of piperidin are added and the mixture is heated during 1 hour to 150° C. until all the 1-oxy-2.4-diaminoanthraquinone has disappeared. After cooling the 4-amino-µ-phenyl-1.2-anthraquinone-oxazol separates in brown crystals which dissolve with an orange coloration in pyridin, and with a yellow coloration in concentrated sulfuric acid, which coloration soon turns green.

The new product yields a vat with hydrosulfite and caustic alkali which dyes cotton a brownish-orange fast shade.

I claim:—

1. The herein described new vat dyestuffs being aminoanthraquinoneoxazols having most probably the following general formula:

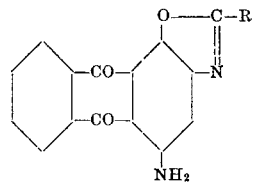

R meaning a substituent, which are after being dried and pulverized brown powders soluble in pyridin, yielding vats with hydrosulfite and caustic soda lye, dyeing cotton generally from brown to orange shades, substantially as described.

2. The herein described new vat dyestuffs being amino-anthraquinoneoxazols having most probably the following general formula:

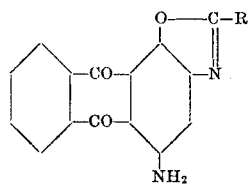

R meaning an aryl group, which are after being dried and pulverized brown powders soluble in pyridin, yielding vats with hydrosulfite and caustic soda lye, dyeing cotton generally from brown to orange shades, substantially as described.

3. The herein described new vat dye having most probably the formula:

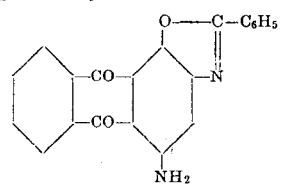

crystallizing in the shape of brown crystals, soluble in concentrated sulfuric acid with a yellow coloration turning green; dyeing cotton from the hydrosulfite vat brownish-orange shades, substantially as described.

In testimony whereof I have hereunto set my hand in the presence of two subscribing witnesses.

HERMANN FRIEDMANN. [L. S.]

Witnesses:
   HELEN NUFER,
   A. NUFER.